(12) United States Patent
Susfalk et al.

(10) Patent No.: US 7,793,559 B2
(45) Date of Patent: Sep. 14, 2010

(54) MONITORING PROBES AND METHODS OF USE

(75) Inventors: Richard Susfalk, Reno, NV (US); James Brock, Boise, ID (US)

(73) Assignee: Board of Regents of the Nevada System of Higher Education, on Behalf of the Desert Research Institute, Reno, NV (US)

( * ) Notice: Subject to any disclaimer, the term of this patent is extended or adjusted under 35 U.S.C. 154(b) by 40 days.

(21) Appl. No.: 11/670,903

(22) Filed: Feb. 2, 2007

(65) Prior Publication Data

US 2008/0184827 A1 Aug. 7, 2008

(51) Int. Cl.
G01D 21/00 (2006.01)

(52) U.S. Cl. .................................... 73/866.5

(58) Field of Classification Search ............... 73/866.5; 374/170; 175/40, 45; 438/15, 106
See application file for complete search history.

(56) References Cited

U.S. PATENT DOCUMENTS

| | | | |
|---|---|---|---|
| 3,938,385 A | 2/1976 | Horwath | 374/137 |
| 3,968,691 A * | 7/1976 | Balkanli | 374/136 |
| 3,981,187 A | 9/1976 | Howell | 73/152.13 |
| 4,074,756 A | 2/1978 | Cooke | 166/277 |
| 4,251,794 A | 2/1981 | Swenson | 338/26 |
| 4,343,181 A | 8/1982 | Poppendiek | 73/152.13 |
| 4,360,277 A | 11/1982 | Daniel et al. | 374/137 |
| 4,436,438 A | 3/1984 | Voznick | 374/165 |
| 4,557,608 A | 12/1985 | Carver | 374/170 |
| 4,576,485 A | 3/1986 | Lambert | 374/130 |
| 4,616,705 A | 10/1986 | Stegemeier et al. | 166/250.01 |
| H240 H | 3/1987 | Swenson | 340/870.17 |
| 5,031,330 A * | 7/1991 | Stuart | 33/366.12 |
| 5,063,776 A | 11/1991 | Zanker et al. | 73/152.21 |
| 5,121,993 A | 6/1992 | Carrigan et al. | 374/29 |
| 5,207,227 A | 5/1993 | Powers | 600/504 |
| 5,372,032 A | 12/1994 | Filippi et al. | 73/40.5 R |
| 5,936,770 A | 8/1999 | Nestegard et al. | 359/530 |
| 5,959,547 A * | 9/1999 | Tubel et al. | 340/853.2 |
| 6,147,931 A | 11/2000 | Seaman et al. | 367/153 |

(Continued)

OTHER PUBLICATIONS

"1—Wire and iButton—Maxim/Dallas," 2p., downloaded from http://www.maxim-ic.com/auto_info.cfm on Oct. 26, 2006.

(Continued)

*Primary Examiner*—Hezron Williams
*Assistant Examiner*—Tamiko D Bellamy
(74) *Attorney, Agent, or Firm*—Ryan A. Heck; UNR/DRI Technology Transfer Office (57) ABSTRACT

Certain disclosed embodiments provide sensing devices of the type useable to obtain measurements from a plurality of positions of a substrate, such as in a well, body of water, soil, snow pack, or ice pack. In a particular implementation, the sensing device includes a housing having a length. A plurality of digital sensors are disposed at a plurality of positions along the length of the housing. A communication bus is in communication with each of the plurality of sensors. A data collection or transmission device is in communication with the communication bus. Further implementations provide sensing devices having a housing formed from a plurality of modular sections. Sensors are disposed in at least one of the modular sections. Also disclosed are networks formed from a plurality of the disclosed devices.

19 Claims, 9 Drawing Sheets

U.S. PATENT DOCUMENTS

| | | | |
|---|---|---|---|
| 6,227,703 B1 | 5/2001 | DiMatteo et al. | |
| 6,484,801 B2* | 11/2002 | Brewer et al. | 166/65.1 |
| 6,942,043 B2* | 9/2005 | Kurkoski | 175/40 |
| 7,333,910 B2* | 2/2008 | Ishii | 702/130 |
| 2002/0018399 A1* | 2/2002 | Schultz et al. | 367/81 |
| 2002/0147394 A1 | 10/2002 | Ellingsen | |
| 2003/0219062 A1* | 11/2003 | Egidio | 374/170 |
| 2004/0173382 A1* | 9/2004 | Strand et al. | 175/320 |
| 2005/0194182 A1* | 9/2005 | Rodney et al. | 175/24 |
| 2005/0284659 A1* | 12/2005 | Hall et al. | 175/27 |

OTHER PUBLICATIONS

Crossbow Technology Inc., "MOTE-KIT4x0 MICA2 Basic Kit," 1p., downloaded from http://www.xbow.com/Products/productsdetails.aspx?sid-67 on Dec. 1, 2006.

Crossbow Technology Inc., "MoteWorks," 1-4.

Crossbow Technology Inc., "MPR500/510/520 MICA2DOT Mote" 1p., downloaded from http://www.xbow.com/Products/productsdetails.aspx?sid=73... on Dec. 1, 2006.

Dallas Semiconductor, "DS18S20 High-Precision 1-Wire Digital Thermometer," 1-21.

Dallas Semiconductor, "DS1920 Temperature iButton," 1-22.

Dallas Semiconductor, "DS18S20 1—Wire Parasite-Power Digital Thermometer," 2p., downloaded from http://www.maxim-ic.com/quick_view2.cfm/qv_pk/2815 on Dec. 1,2006.

Dallas Semiconductor. "DS2408 1—Wire 8—Channel Addressable Switch," 2p., downloaded from http://www.maxim-ic.com/quick_view2.cfm/qv_pk/3818 on Jul. 25, 2007.

"Hay-Temp—Tri-States Grain Conditioning Inc." 1p., downloaded from http://www.tsgeinc.com/tempmon/hay/index.htm on Jul. 25, 2007.

Howstuffworks, "How Motes Work," 2p., downloaded from http://computer.howstuffworks.com/mote.htm/printable... on Dec. 1, 2006.

Hukseflux, "STP01 Soil Temperature Profile (&Thermal Conductivity) Sensor with Self-test," 1-3.

iButtonLink, LLC, "Snaku Users Manual," 1-13, Apr. 15, 2004.

iButtoriLink, LLC, "The MultiSensor," 1-14, Oct. 10, 2005,.

"iButtonLink's Sensors page," 2p., downloaded from http://web.archive.org/web/20060517051842/http://www.ibuttonlink.co... on Dec. 1, 2006.

"iButtonLink's Sensors page," 1p., downloaded from http://www.ibuttonlink.com/Sensors.htm on Jun. 27, 2006.

Maxim, "iButton—Contact Memory, Digital Temperature Data Loggers, Java-powered and Secure," 2p. downloaded from http://www.maxim-ic.com/products/ibutton... on Jul. 25, 2007.

Midon Design, "A 1-Wire Sensor Logging Device," 1-32, Apr. 30, 2006.

Midon Design, "LOG08-II Instructions," 2p., downloaded from http://www.midondesign.com/LOG08-II/P02Instructions.html on Oct. 26, 2006.

Midon Design, "LOG08-II, Midon Design LOG08-II," 2p., downloaded from http://www.midondesign.com/LOG08-II/Log-II.html on Jun. 14, 2006.

Midon Design, "LOG08-II Ordering Information," 2p., downloaded from http://www.midondesign.com/LOG08-II/P04OrderInfo.html on Oct. 26, 2006.

Midon Design, "LOG08-II Software Vintages," 1p., downloaded from http://www.midondesign.com/LOG08-II/P03Software.html on Oct. 26, 2006.

Midon Design, "Sensors," 4p., downloaded from www.midondesign.com/Sensors/sensors.html on Oct. 26, 2006.

Midon Design, "Shopping Center," 3p., downloaded from http://www.midondesign.com/midon_prices.html on Oct. 26, 2006.

Midon Design, "Temp08 Serial One Wire Interface," 4p. downloaded from http://www.midondesign.com/TEMP08/TEMP08.html on Oct. 26, 2006.

"Patent Database Search Results: abst/thermal and abst/gradient and abst/ ..." 1p., downloaded from http://patft1.uspto.gov/netacgi/nph-Parser?Sect1=PTO2&Sect2=HITOF... on May 19, 2006.

Product Feature Reference, "Sensors and Functions," 2-3.

RST Instruments, "Thermistor Strings," 1.

"Shore Sales Co.—Bin Temperature Monitoring Systems," 1p., downloaded from http://www.moisturetesters.com/farm/bintemp.shtml on Mar. 20, 2006.

"Temperature Cables and Leadwire," 4p., downloaded from http://www.rolfes.com/products/temperature_cables.htm on Jul. 25, 2007.

"Thermo Reports," 2p., downloaded from http://www.thermodata.com.au/Treports.htm on Jun. 14, 2006.

"Thermocouple Measurements-Developer Zone-National Instruments," 3p., downloaded from http://zone.ni.com/devzone/cda/tut/p/id/2915... on Dec. 1, 2006.

"Thermocouple Profile Probes Made from High-Accuracty Special Limits-of-Error Wire," 3p., downloaded from http://www.omega.com/ppt/pptsc.asp?ref=PP3_PP6_PP10&Nav=tema09... On Dec. 1, 2006.

"Thermodata temperature logger," 3p., downloaded from http://www.thermodata.com/au/OneWire.htm... on Jun. 14, 2006.

Turck, "Cables and Cordsets for Extreme Applications," 1-28.

Turck, "Industrial Automation," 1-2.

Turck, "Industrial Connectivity Products," 1-2.

* cited by examiner

MONITORING PROBES AND METHODS OF USE

STATEMENT OF GOVERNMENT SUPPORT

The invention was made at least in part with United States Government support under U.S. Bureau of Reclamation Award Number 04-FC-81-1064. The United States Government has certain rights in the invention.

TECHNICAL FIELD

The present application relates generally to measuring devices and their methods of use.

BACKGROUND

It can be useful to monitor temperature or other properties at a variety of depths, such at different water or soil depths. Instruments exist that include a rod shaped body housing multiple temperature sensors. An example of such a device is the STP01, available from Hukseflux Thermal Sensors B.V. of Delfte, Netherlands. However, existing instruments typically suffer from various problems.

One such problem is the complicated wiring often associated with typical devices. Each sensor in a probe is typically individually wired. The resulting mass of wires is often difficult to work with and prone to tangling. Such problems can be magnified significantly when multiple probes are used. Increased wiring can also increase the chance of equipment malfunction. In addition, large amounts of wiring can increase the complexity and cost of the device, both material and manufacturing costs. In addition to increased cost, increased material use may make the devices larger in size. Larger sized devices may be less useful for some applications.

Large amounts of wiring can also increase the complexity of data analysis, as a particular measurement will involve analysis of a number of data streams. Multiple wires can also decrease the sensitivity of the device. For example, generally the more wire that is used, the greater the signal degradation caused by the resistance of the wire.

The SNAKU, sold by iButtonLink.com of East Troy, Wis., includes a plurality of analog thermocouple devices that are conveyed by individual wires encapsulated within a sheath to an interface circuit device located on one end. This circuit device performs a voltage measurement of the thermocouple output that is digitized and provides an address that permits identification and selected by a bus master on a 1-wire network. Thus, the SNAKU's use of analog sensors and associated cabling along its length can result in detrimental effects on data quality and application versatility due to size constraints.

SUMMARY

The present application provides monitoring devices, systems, and their methods of use. Some embodiments provide a monitoring device having a housing, which may be a water-resistant housing. A plurality of digital sensors are disposed at various positions along the length of the housing. In a particular example, the plurality of digital sensors are individually addressable. A communication bus is disposed in the housing and in electrical communication with the plurality of digital sensors. In a specific example, the communication bus includes a circuit board disposed in the housing and connected to at least a portion of the plurality of digital sensors.

The device further includes a data storage or transmission unit. In some implementations, the device includes a wireless transceiver. In further implementations, the device includes a data logger. In yet further implementations, the transmission unit includes a cable that transports data to a remote computer.

Some configurations of the monitoring device include a power supply, such as a battery. In some examples the power supply is in power supply communication with each of the plurality of digital sensors. Further examples include a power supply in power supply communication with an external power source.

The present disclosure also provides a modular monitoring device, in some embodiments. The monitoring device includes a housing formed from a plurality of interconnected modules. The modules are the same length in some implementations, and of different lengths in other implementations.

At least one of the modules includes a sensor. In some configurations, at least one of the modules includes a plurality of sensors disposed along the length of the module. In yet further configurations, a plurality of modules each include at least one sensor. In a specific example, the modules include different numbers or types of sensors.

The sensors are digital sensors, in some examples. In further examples, the sensors are of a plurality of types, such as being selected to measure one or more of temperature, pressure, humidity, light, magnetic properties, electrical properties, chemical properties, wind speed, and radiation. The sensors are individually addressable in some examples.

The monitoring device includes a communication network, such as a bus, in communication over the plurality of modules. In a particular implementation, at least one of the modules includes a circuit board disposed in the housing of the module. At least one of the sensors is in communication with the circuit board.

In a specific disclosed device, a joint formed by the interconnected modules is covered by a sleeve or is encapsulated. The sleeve is selectively positionable, in some specific examples. In further examples, the sleeve is selectively securable over the joint. The joint is encapsulated and further covered by a sleeve, in a particular implementation. In some configurations, the communication network passes through the joint. In one example, the joint includes mating pin and socket connections in communication with the communication network.

The modular device can include additional components, such as power supply or transmission components or data recordation or transmission units.

The present disclosure also provides sensor networks comprising a plurality of the disclosed monitoring devices. In various implementations, the plurality of monitoring devices provide a two or three dimensional grid of sensors. The grid can be used for various purposes, such as monitoring: groundwater temperature in a well, soil temperature, atmospheric temperature, ocean temperatures at various depths, the temperature inside grain silos, the stability of snow or ice, water level, thermal conductivity, and the rate of fluid movement.

In some embodiments, the disclosed devices allow for higher sensitivity measurements or facilitate data collection or analysis, such as through their use of digital sensors, individually addressable sensors, or a common communication bus. Reduced wiring can simplify device construction and reduce material and assembly costs. Embodiments of the present disclosure using modular devices can facilitate assembly and transportation of devices. In addition, modular devices can be configured as needed for a particular application and reconfigured for new uses.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

As used herein, the singular forms "a," "an," and "the" refer to one or more than one, unless the context clearly dictates otherwise. As used herein, the term "includes" means "comprises." Unless the context clearly indicates otherwise, the disjunctive "or" includes the conjunctive "and."

Stratified Sensor Device

Figure 1:
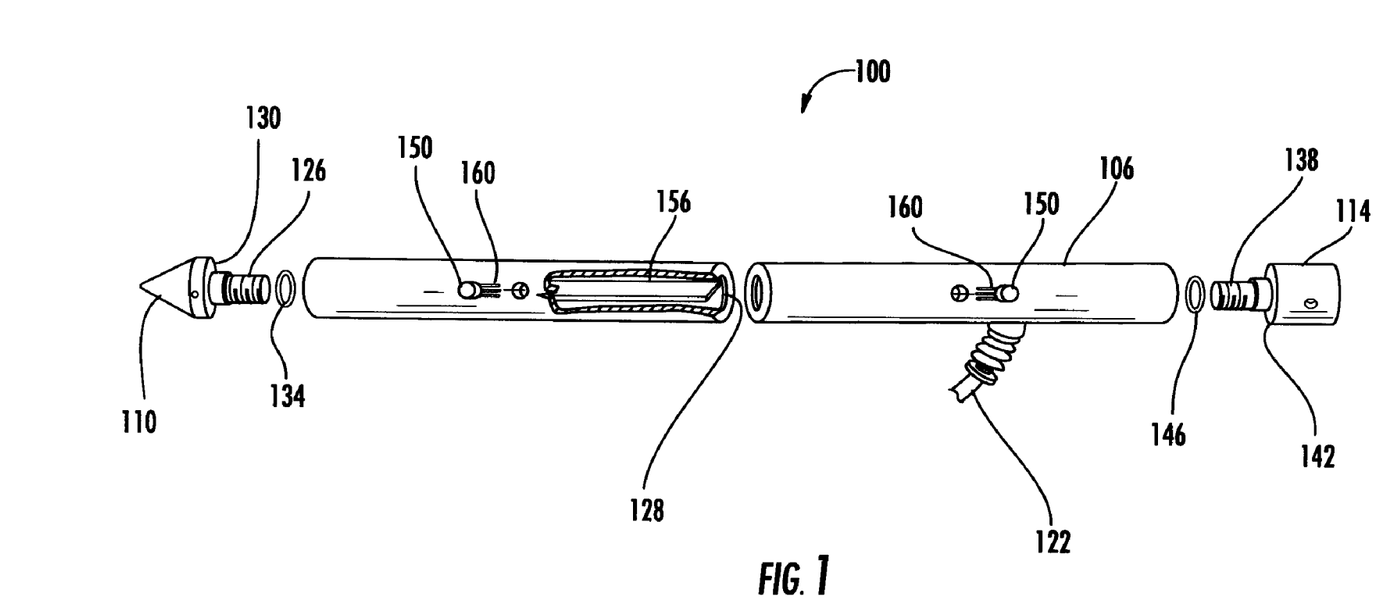
FIG. 1 is a front elevational view of a disclosed monitoring device with a cutaway section showing the interior of the device.

FIG. 1 illustrates an embodiment of a monitoring apparatus 100 according to the present disclosure. The monitoring apparatus 100 has a generally cylindrical body 106, a conical distal end 110, a cylindrical proximal end 114, and a cord 122 extending from the body 106 towards the proximal end 114. In some embodiments, the cord 122 extends from another portion of the apparatus 100 or is omitted.

The monitoring apparatus 100 may be shaped differently, such as having a square, rectangular, elliptical, or parabolic cross section. In some implementations the monitoring apparatus 100 is non-linear, such as being curved or having linear sections located at angle to one another. The conical shape of the distal end 110 may be useful when the apparatus 100 will penetrate a substrate. However, the ends 110, 114 may be shaped differently. For example, such as when the device 100 will not penetrate a substrate, the distal end 110 can be cylindrical.

The device 100 may be constructed in any desired dimension, including varying the inner diameter, outer diameter, and length of the device 100. In a particular example, the device 100 is constructed with an outer diameter of one inch.

In particular implementations, the body 106 is substantially rigid, such as being made from a rigid material or being constructed so as to be substantially rigid. However, the body 106 is flexible in some implementations. The properties of the body 106 can be selected based on the environment in which the device 100 will be used.

The body 106, distal end 110, and proximal end 114 may be constructed from any suitable material. Typically, materials are chosen that are suitable for the conditions under which the apparatus 100 will be used. For example, the materials may be chosen to be resistant to weather, operating temperatures and pressures, soil or other particulate materials, or liquids. In some embodiments, the material is selected depending on desired thermal conductive properties for a particular application, for example different applications may suggest using material that is minimally conductive, or that matches or exceeds the thermal conductivity of the surrounding media or environment.

The material may be selected to be non-toxic, such that it can be used with materials intended for human consumption, such as grain. In particular examples the material is a synthetic material, such as polymeric materials. In a specific example, the device 100 is made from Delrin, available from E. I. du Pont de Nemours and Co., of Wilmington, Del. In further examples, the material includes a metal or metallic substance, such as being formed from stainless steel. The materials from which the body 106, distal end 110, and proximal end 114 are constructed may be the same or different. In a specific example the entire apparatus 100, optionally with the exception of the terminal end of the cord 122, is constructed from a waterproof or water resistant material.

The distal end 110 is generally conical and includes a threaded cylinder 126 extending axially from a planar surface 130 of the distal end 110. The diameter of the cylinder 126 is smaller than the diameter of the distal end 110. The threads of the threaded cylinder 126 are received by mating threads (not shown) formed on the hollow interior 128 of the body 106. A washer or o-ring 134 may be inserted over the threaded cylinder 126, such that it abuts an inner surface of the cylindrical body 106 when the distal end 110 is attached to the cylindrical body 106.

The proximal end 114 also includes a threaded cylinder 138 extending from a planar surface 142 of the proximal end 114. The threads of the threaded cylinder 138 are received by mating threads formed in the interior 128 of the body 106. A washer 146 is disposed about the threaded cylinder 138.

A plurality of apertures are formed in the cylindrical body 106 and provide access to the hollow central portion 128 of the body 106. The apertures may be regularly or irregularly spaced and may be located at the same or different points along the circumference of the body 106. A plurality of sensors 150 are longitudinally disposed along the surface of the body 106 through the apertures. In further implementations the sensors 150 are located on additional areas of the device 100, such as the proximal end 114 or the distal end 110.

The sensors 150 extend through the apertures and are connectable to a board 156 or other communication network or structure located in the interior 128 of the body 106. In further embodiments the communication structure 156 is embedded within or disposed on the walls of the body 106. In some embodiments, the communication structure 156 is a wire or cable. In further embodiments, the communication structure 156 includes one or more wireless transceivers.

In some examples, the sensors 150 include one or more pins 160. The pins 160 may serve various purposes, such as transmitting or receiving data to or from the communication structure 156 or transmitting power. The pins 160 are connected to the communication structure 156.

The sensors 150 may be the same or different. For example, in some examples each of the sensors 150 includes a temperature sensor. In further examples the sensors 150 are different or measure multiple quantities. In addition to temperature, the sensors 150 can be selected to measure pressure, humidity, light, magnetic properties, electrical properties (such as resistivity), chemical properties, wind speed, or radiation (including solar radiation). The sensors 150 can also include positional sensors, such as to determine or help maintain a desired position of a device 100. In yet further embodiments, the device 100 includes a separate positional, or other type, sensor that need not be a sensor 150.

Suitable sensors include the MD3003, MD3014, MD3020A, MD3020B, MD3020C, and MD3020E from Midon Design, Inc., of Suwanee, Ga. Suitable sensors are also available from Thermodata Pty Ltd of South Yarra, Australia and Maxim Integrated Products, Inc., of Sunnyvale, Calif. In a particular example, the sensors 150 are the DS18S20 temperature sensors available from Maxim Integrated Products, Inc.

In some embodiments, the sensors 150 are individually addressable sensors that share a common communication network. In a particular implementation, the sensors 150 are connected to three wires. In such implementation, the sensors 150 can use the 1-wire communication protocol, available from Dallas Semiconductor Corp., of Dallas, Tex.

The sensors 150 can be secured into the cylindrical body 106 by any suitable means, such as by epoxy or other adhesives. The circuit board 156 axially extends through the center of the cylindrical body 106. In certain implementations, the circuit board 156 includes mounts (not shown) into which the sensors 150 are inserted. In further embodiments, the sensors 150 are soldered or otherwise connected to the circuit board 156.

Each device 100 can have a single circuit board 156 or multiple circuit boards 156. When the device 100 includes multiple circuit boards 156, each board 156 can be wired together. In a particular example, the printed circuit board 156 is 20 inches long. Three circuit boards 156 can be connected to provide a 60 inch device 100. The board 156 may be constructed with a suitable number of layers for the number of connections desired. For example, a five-layer board 156 can support 12 conductors from end to end. The boards 156 can be mounted to a support structure (not shown), such as epoxy-glass laminate material, to provide more structural support to the boards 156.

Each layer of the board 156 may be placed in communication with a sensor 150 using a pad. A sensor 150 can be attached to each pad. In a particular example, a pad is located every 5 cm on the circuit board 156. The length of the circuit board 156 can be varied, as can the number and spacing of the pads. The pads can be placed in communication with various layers of the board 156 and the layers can be configured to place the pads in electrical communication with an output of the board 156, such as a wiring harness. The wiring harness can then be connected to other electrical components or means of communication.

The cylindrical body 106 includes an aperture (not shown) through which a cord 122 extends. The cord 122 is used to place the device 100 in communication with a remote computer. In further embodiments, the cord 122 is omitted and the device 100 communicates with a remote computer using an internal wireless transceiver (not shown). Suitable wireless transmitters include the Mote products available from Crossbow Technology, Inc., of San Jose, Calif., including the MICA2DOT transceiver. Other implementations of the device 100 include an internal data logger. Host adapters that provide communication commands for interfacing with Dallas Semiconductor 1-wire devices include the 1-wire bus masters available from Embedded Data Systems of Lawrenceburg, Ky., and Midon Design's (Suwanee, Ga.) LOG08-II controller.

The device 100 may be constructed using any suitable techniques. In one example, the body 106 is formed from a hollow tube of material using a lathe. The apertures for the sensors 150 may be formed in the body 106 using a CNC mill.

In a particular assembly method, the board 156 (and supporting frame, if used) are inserted into the interior of the body 106. The sensors 150 are then inserted into their respective apertures and placed into contact with the board 156. Latex tubing is inserted behind the board 156 and fished behind the length of the board 156. One end of the tubing is clamped off and the tubing is inflated. As the tubing is inflated the board 156 is pushed towards the apertures, allowing the sensors 150 to extend into their respective apertures.

While the tubing is still inflated, an adhesive is introduced into the holes 160 to secure the sensors 150 in place. In a particular example, the adhesive is a thermally-conductive polyurethane compound. The latex tubing may then be trimmed or removed. Encapsulating material, such as thermally-insulating polyurethane, oil, or epoxy, is injected through access ports (not shown in FIG. 1) into the interior of the device 100, such as the cavity 128. The access ports are then plugged, such as with socket head set screws.

Modular Stratified Sensor Device

Figure 2:
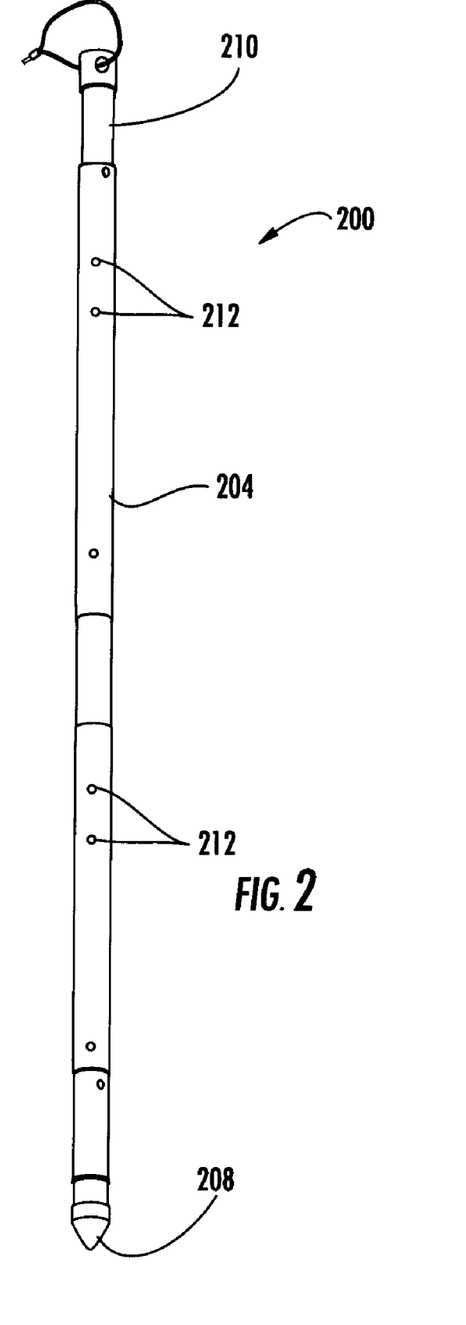
FIG. 2 is a front elevational view of a disclosed modular monitoring device.

FIG. 2 illustrates an implementation of a device 200 constructed from modular components. The device 200 has generally similar components to the device 100 of FIG. 1. For example, the device 200 includes a generally cylindrical body 204, a distal end 208, a proximal end 210, and a plurality of sensors 212. However, the body 204, distal end 208, and proximal end 210 are configured to provide a modular arrangement.

Figure 2A:
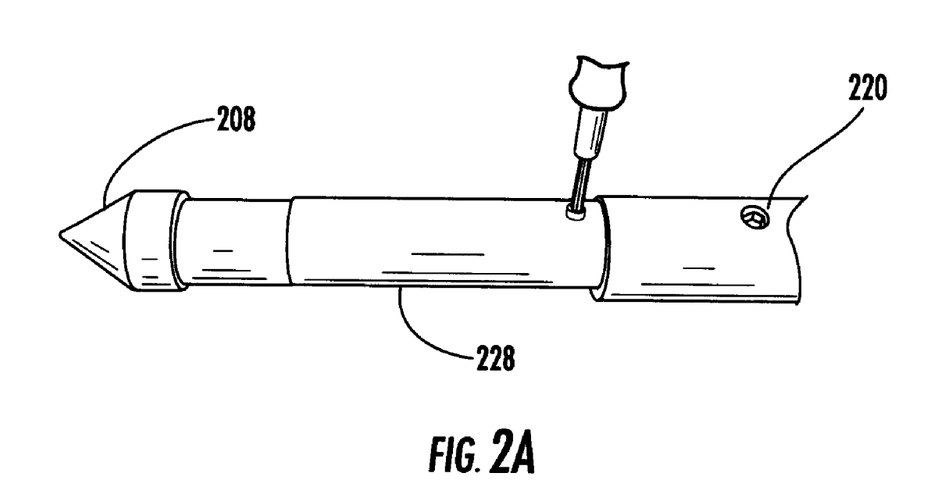
FIG. 2A is a detailed elevational view of the proximal end of the monitoring device of FIG. 2.

The distal end 208 may be constructed in an analogous manner to the distal end 110 of the device 100 (FIG. 1). For example, the distal end 208 may have a threaded axially extending cylinder that is received by a matingly threaded portion of the body 204. As shown in FIG. 2A the distal end 208 includes an access opening 220 through which a fill material, such as polyurethane, may be introduced to fill the interior of the distal end 208. In further implementations, the distal end 208 is constructed from solid material and the access hole 220 omitted.

The device 200 further includes a sleeve 228 positionable over the joint formed between the distal end 208 and the body 204. The sleeve 228 is selectively positionable such that the sleeve 228 may be positioned proximate the distal end 208 while the distal end 208 is being coupled to the body 204. Once the joint is secure, the sleeve 228 can be slid over the joint. The sleeve 228 may then be secured in position, such as by inserting a screw through an aperture in the sleeve 228 into a matingly threaded aperture in the body 204. The sleeve 228 can be constructed from any suitable material, such as stainless steel. The sleeve 228 can aid in providing structural rigidity to the device 200 and for keeping moisture and other contaminants out of the interior of the device 200.

In particular implementations, the distal end 208 is generally cylindrical, rather than the conical structure shown for the device 100. In addition, the distal end 208 is used in some implementations to provide additional functionality. In some examples the distal end 208 includes a data logger, communications module (such as to wirelessly communicate data), or a power supply unit, such as a battery compartment.

Figure 2B:
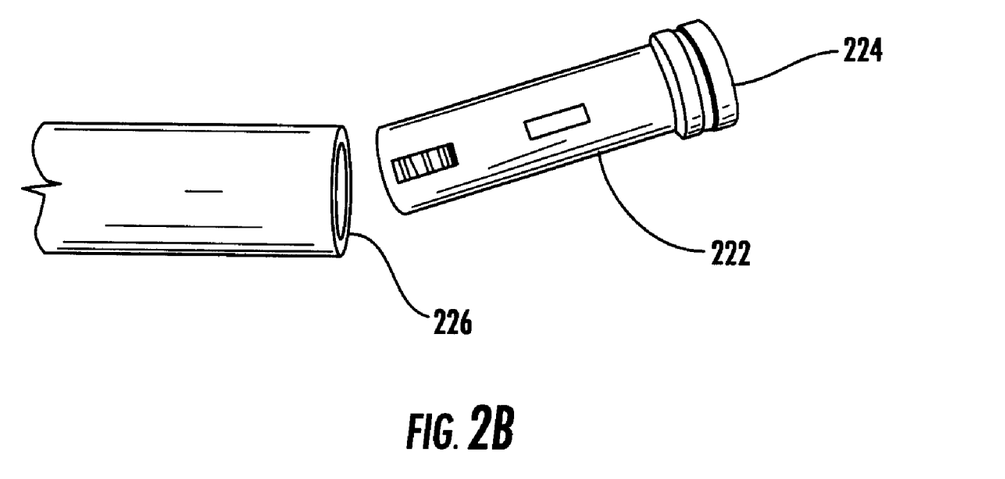
FIG. 2B is a detailed elevational view of a battery compartment useable in the proximal end of the device of FIG. 2.

FIG. 2B illustrates a battery storage unit 222. The battery storage unit 222 fits within a hollow portion of the distal end 208. A threaded end cap 224 may then be screwed into the matingly threaded opening 226 of the distal end 208. Alternatively, the battery storage unit 222 may be threaded to provide a secure fit with the opening 226.

Figure 2C:
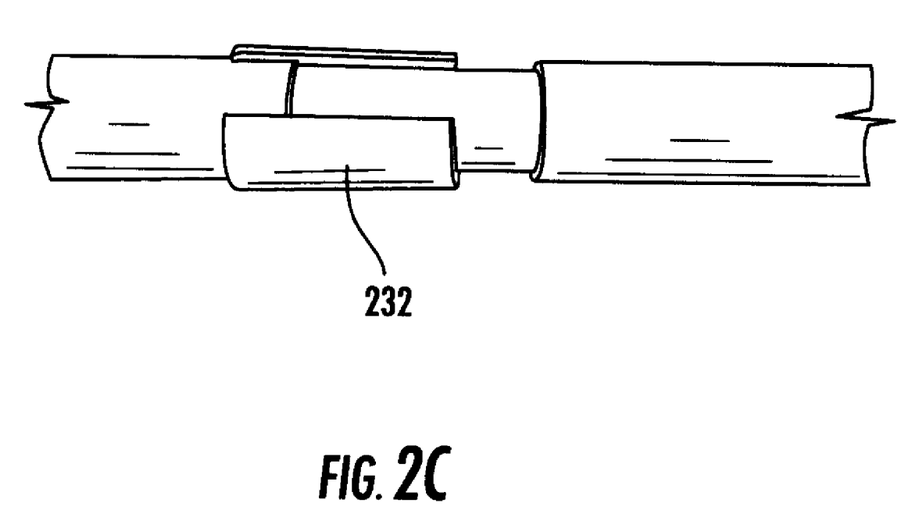
FIG. 2C is a detailed elevational view of portion of the device of FIG. 2 showing how spacers can be used to help provide a more uniform device diameter.

With reference now to FIG. 2C, the joint formed by the distal end 208 and the body 204 has a narrower diameter than the body 204 or the distal end 208. Spacers 232, which are made from the same material as the body 204 in some examples, are placed over the joint, in some implementations, in order to give the device 200 a comparatively uniform diameter. The spacer 232 is generally cylindrical, having an axially extending split that allows the spacer 232 to be placed over the joint.

Figure 2D:
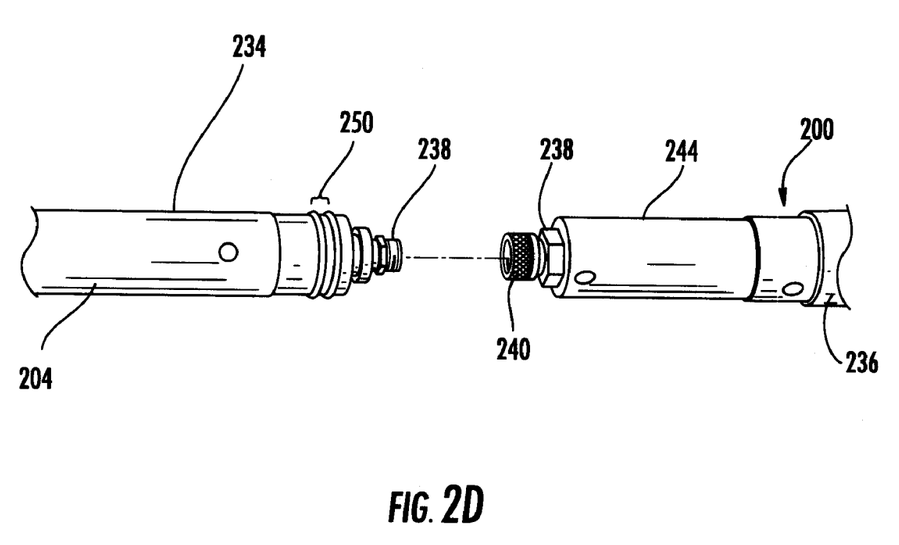
FIG. 2D is a detailed elevational view of two modular portions of the device of FIG. 2 illustrating how the two portions may be coupled together.

As shown in FIG. 2D, the body 204 is formed from two modular pieces 234, 236. Each modular piece 234, 236 is constructed generally as described for the body 204. Each modular piece 234, 236 includes an axially extending threaded coupling cylinder 238. The coupling cylinders 238 are receivable by a matingly threaded coupling nut 240. Each modular piece 234, 236 further includes an access opening through which fill material can be introduced, as previously described.

The modular pieces 234, 236 may each include a communication system or network (not shown), such as a bus, as described above. For example, the pieces may include circuit boards forming a communication bus.

Wiring (not shown) or other electrical connection means can be passed through each coupling cylinder 238. In another implementation, the coupling cylinders 238 include mating male and female pin connectors. Suitable coupling cylinders 238 and coupling nuts 240 are available from TURCK Inc., of Plymouth Minn. For example, the coupling cylinders may be front mount EUROFAST receptacles providing IEC IP 68 water protection. If a higher degree of water resistance is desired, the coupling cylinders 238 can be selected to withstand a marine environment, including such connectors available from Impulse Enterprise of San Diego, Calif., or SEACON Branter & Associates of El Cajon, Calif.

As with the distal end 208, the joint formed by the coupling cylinders 238 is covered by a sleeve 244. The sleeve 244 may be constructed and operate as the sleeve 228 described in conjunction with the distal end 208. In addition, one or more o-rings 250 can be placed intermediate each modular piece 234, 236 and the coupling cylinder 238. The o-rings 250 may help provide a tight seal over the joint.

Figure 2E:
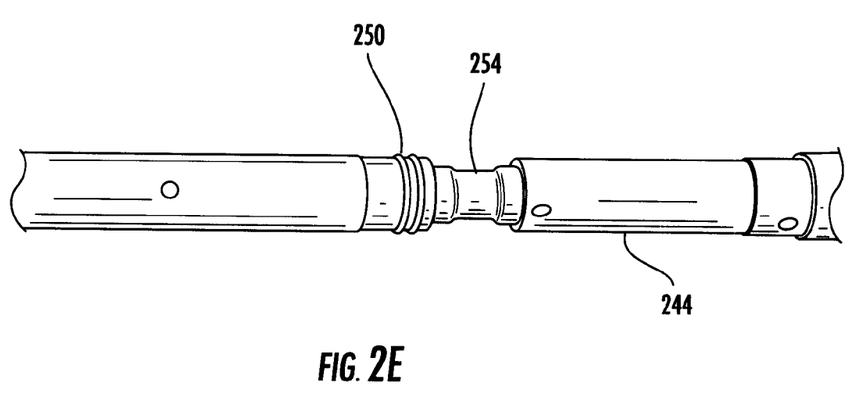
FIG. 2E is an elevational view of the modular portions of FIG. 2D showing how a joint formed by the two portions may be covered by a coating.

With reference to FIG. 2E, in order to further seal the joint, a covering or coating 254 is formed over the joint, in certain implementations. In a specific example, the covering 254 is formed from adhesive-lined heat-shrinkable tubing. Suitable heat-shrinkable tubing is commercially available, such as from Qualtek Electronics Corp. of Mentor, Ohio and CableOrganizer.com, Inc., of Fort Lauderdale, Fla.

The proximal end 210 is connected to the modular piece 236 in a similar manner to which the modular piece 234 is connected to the distal end 208. Accordingly, the proximal end 210 includes an axially extending threaded cylinder (not shown, analogous to threaded cylinder 138 of FIG. 1) that is received by a matingly threaded aperture (not shown) of the modular piece 236. The joint formed by the proximal end 210 and the modular piece 236 may be covered by a covering (analogous to the coating 254 of FIG. 2E).

Figure 2F:
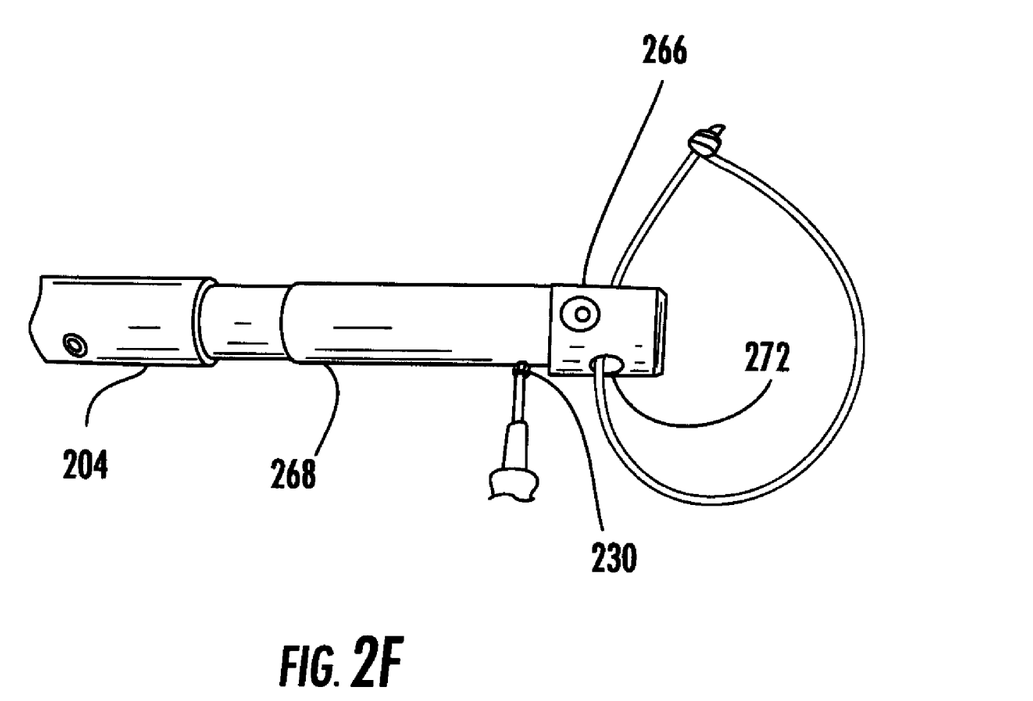
FIG. 2F is a detailed elevational view of the distal end of the monitoring device of FIG. 2.

With reference to FIG. 2F, the joint formed by the proximal end 210 and the modular piece 236 can be further protected by a sleeve 268, analogous to the sleeve 228, securable by a screw 230. The proximal end 210 includes an access hole 266 for the introduction of fill material. In further embodiments, the proximal end 210 is formed from solid material and need not include the access hole 266.

The proximal end 210 may have a number of configurations. As shown in FIG. 2F, the proximal end 210 defines an aperture 272 through which a cord, cable, or similar device can be threaded. In such embodiments, the proximal end 210 may be configured to wirelessly transmit data or include a data logger to store data, such as until the device 200 is removed from an operating environment. In further configurations, the proximal end 210 may be configured with a cable or wire harness (not shown), such as described regarding the proximal end 114 of the device 100. The cable can be used to transmit data to a remote computer or to transmit power to the device 200. In other implementations, such components can be included in the distal end 208 rather than the proximal end 210.

The device 200 may be assembled generally as described for the device 100. The modular pieces 234, 236 may be assembled as follows. After positioning and potting the sensors 212 as described above for the device 100, the coupling cylinders 238 are installed in the ends of the modular pieces 234, 236 and then wired to the circuit boards (not shown). Wiring splices may be encapsulated with heat shrink tubing. Hollow portions of the device 200 may then be filled with thermally-insulating polyurethane through respective access ports (such as access port 220), as described for the device 100. The access ports are then plugged, such as with socket head set screws.

Following assembly of the modular pieces 234, 236 individual sensors 212 may be tested electrically and calibrated with suitable standards. Because multiple sensors may be present within a given module, such testing and calibration is facilitated when sensors 150 include those that are individually addressable as described above.

The modular nature of the device 200 allows a variety of device configurations to be conveniently assembled, such as by a manufacturer or an end user. Individual modules may be transported to the site of use, where they can then be fieldassembled. The modular nature of at least some embodiments of the disclosed devices can significantly decrease the cost of, and improve the ease of, device transportation, especially for applications that involve measurements over comparatively long distances. Devices used for such applications may also be comparatively long, and thus possibly more difficult to transport.

In addition, existing instruments can be reconfigured for new uses, or faulty components replaced. Devices for use in various applications may be configured with components that provide different numbers of sensors, different radial positions of sensors, different longitudinal sensor positions, or different types or combinations of sensors.

Methods of Use

Figure 3:
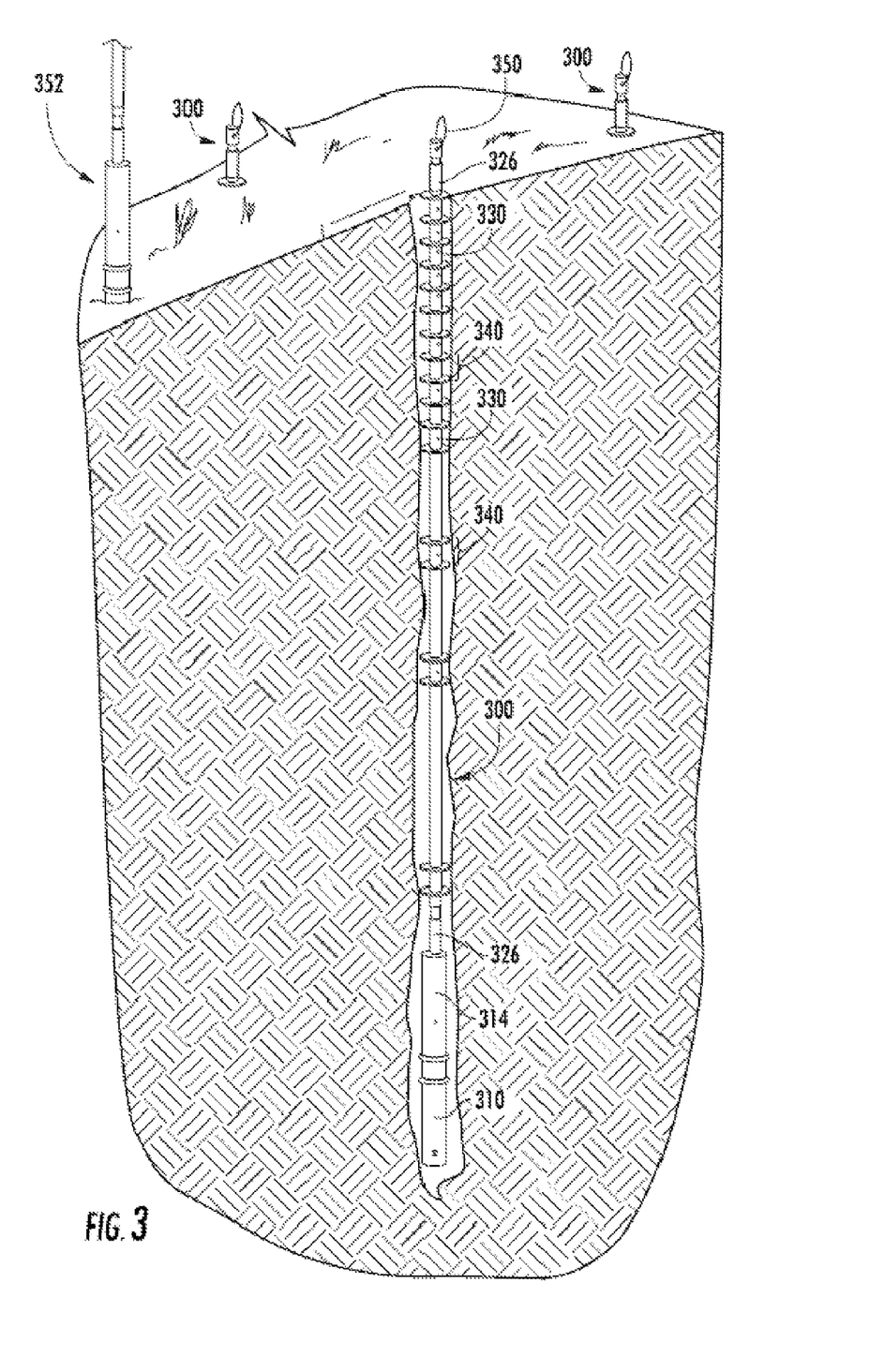
FIG. 3 is a schematic view of a plurality of disclosed monitoring devices installed in a number of monitoring wells to provide a three-dimensional grid of sensors.

FIG. 3 illustrates a plurality of sensor devices 300 deployed in multiple wells forming a three-dimensional grid of sensors. The devices 300 have a length of about 218 cm and include an integrated power supply 310 and data logger 314. The various modular components of the devices 300 are connected by coupling sections 326. Each of a plurality of sensors 330 are isolated in the well using isolation packers 340. The isolation packers 340 help insure that each sensor 330 records data from a particular depth of the monitoring environment. The isolation packers 340 are omitted in some applications. The sensors 330 are variably distributed along the devices 300. In some applications a greater number of sensors 330 may be located towards either end 350 of the devices 300 and fewer sensors 330 located towards the middle of the devices 300. As noted above, the sensors 330 are distributed differently in further embodiments, such as having more sensors 330 in the middle portion of the devices 300 or having uniformly distributed sensors 330.

In embodiments where a portion of the device 300 extends from the monitoring environment, a data transmission or storage portion can be located in the extending portion, such as to facilitate communication or data retrieval.

Although in FIG. 3 the devices 300 are shown located primarily in a well, the sensors can be deployed in other manners. For example, the devices 300 can be completely buried, submerged, or otherwise placed within the medium to be monitored.

FIG. 3 also illustrates a device 352 where the bottom portion of the devices is secured in the ground and the sensor-bearing portion of the device 352 extends upwardly into the monitoring environment (such as the atmosphere). Such a configuration can be useful in other environments, such as measuring snow pack or the properties of a fluid, such as by mounting the device on a riverbed.

While the devices 300 and 352 have generally been shown in vertical positions, the devices 300 are placed at an angle or horizontally in further embodiments.

The disclosed devices and methods can provide a number of advantages. For example, at least some implementations employ sensors that perform analog to digital conversions and transmit digital data to a data logger or other collector or transmission device. Transmission of a digital signal can increase the sensitivity of the devices. Similarly, the use of a common wire for data transmission can reduce signal losses induced by resistance in the wire. Fewer wires can also decrease the cost of the devices and render the devices easier with which to work.

Particular embodiments produce a particularly clean signal because of the communication protocol employed in the device. For example, when the sensors of the disclosed apparatus communicate using the 1-wire protocol, the wiring of the device may be greatly simplified compared to prior technology.

The disclosed devices can be used in applications where it is useful to obtain data at a number of different depths, levels, or radial positions. For example, the devices can be used for applications such as monitoring: groundwater temperature in a well, soil temperature, atmospheric temperature, ocean temperatures at various depths, the temperature inside grain silos, the stability of snow or ice, water level, thermal conductivity, and the rate of fluid movement. Multiple devices may be networked to provide a two- or three-dimensional array of sensors. Such a mesh network may allow for more detailed measurements than prior techniques. The comparatively inexpensive cost of at least some of the disclosed devices can increase the number of devices that can be installed for a particular application, potentially increasing the amount of data available for analysis.

The modular nature of certain disclosed embodiments allows custom devices to be assembled for a particular application, as well as allowing existing devices to be reconfigured for new uses or optimized for a particular use. For example, the length of the device can be easily adjusted, such as by including additional modular sections, including sections that lack sensors. The number, type, and position of the sensors in the devices can be similarly customized for a particular use. Reduced device wiring may allow for smaller devices.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A sensing device of the type useable to obtain measurements from a plurality of positions of a substrate, the sensing device comprising:
    a housing having a length and comprising a plurality of physically interconnected and electrically coupled modules, each module comprising an exterior surface defining an interior cavity of the module, wherein the joined exterior surfaces of the modules make up an exterior surface of the housing and define an interior cavity of the housing surrounded by the exterior housing surface, a plurality of apertures being defined in the exterior housing surface;
    a plurality of digital sensors disposed in the apertures at a plurality of positions along the length of the housing;
    a communication structure disposed in the interior cavity and in communication with each of the plurality of sensors; and
    a data collection or transmission device in communication with the communication structure.

2. The sensing device of claim 1, wherein a first module of the plurality of modules comprises a pin and a second module of the plurality of modules comprises a socket adapted to receive the pin, the pin and socket electrically coupled to the communication structure.

3. The sensing device of claim 2, wherein each module of the plurality of modules comprises a portion of the communication structure, each portion comprising a circuit board disposed in the interior cavity of a respective module and electrically coupled to a portion of the plurality of sensors and the circuit boards are electrically coupled through the pin and socket.

4. A sensing device of the type useable to obtain measurements from a plurality of positions of a substrate, the sensing device comprising:
    a housing having a length and comprising a plurality of interconnected housing modules;
    a joint coupling two of the plurality of interconnected housing modules;
    an electrical connector extending through the joint;
    a plurality of sensors disposed at a plurality of positions along the length of a housing module;
    a communication structure in communication with each of the plurality of sensors and electrically coupled to the electrical connector; and
    a data collection or transmission device electrically coupled to the communication structure.

5. The sensing device of claim 1, the housing having a first end and further comprising a conical tip coupled to the first end of the housing, the conical tip extending from the housing in an axially outwardly extending point.

6. The sensing device of claim 5, wherein the conical tip comprises a tip and a base and a threaded protrusion extends from the base and the first end of the housing comprises threads for matingly engaging the threads of the threaded protrusion.

7. The sensing device of claim 1, further comprising a coupling cylinder coupled to a first module of the plurality of modules, a coupling cylinder coupled to a second module of the plurality of modules, and wiring extending through the coupling cylinders and electrically coupled to the communication structure.

8. The sensing device of claim 1, wherein the exterior surface of the housing has a substantially constant diameter.

9. The sensing device of claim 1, wherein the communication structure comprises a circuit board disposed in the interior cavity of the housing and to which the sensors are mounted.

10. The sensing device of claim 4, wherein the housing defines an interior cavity for each housing module and a portion of the communication structure is located in cavity of each housing module.

11. The sensing device of claim 4, wherein the plurality of interconnected housing modules include a first housing module and a second housing module and the plurality of sensors are located along the length of the first housing module.

12. The sensing device of claim 4, wherein the plurality of interconnected housing modules include a first housing module and a second housing module and the plurality of sensors are located along the lengths of the first and second housing modules.

13. The sensing device of claim 4, wherein at least one of the plurality of housing modules does not include sensors.

14. The sensing device of claim 4, wherein each housing module has a length and at least one housing module has a different length than the other housing modules.

15. A sensing device of the type useable to obtain measurements from a plurality of positions of a substrate, the sensing device comprising:
    a housing having a length, a threaded end, and an exterior surface, the exterior surface defining a plurality of apertures and an interior cavity surrounded by the exterior surface;
    a plurality of digital sensors disposed in the apertures at a plurality of positions along the length of the housing;
    a communication structure disposed in the interior cavity and in communication with each of the plurality of sensors;
    a data collection or transmission device in communication with the communication structure; and
    a conical tip coupled to the threaded end of the housing and extending from the housing in an axially outwardly extending point, the conical tip comprising a tip and a base, the base having an extending threaded protrusion, the threads of the threaded protrusion configured to matingly engage the threads of threaded housing end.

16. The sensing device of claim 15, wherein the housing is a unitary structure.

17. A sensor network comprising a plurality of sensing devices according to claim 15.

18. A sensor network comprising a plurality of sensing devices according to claim 1.

19. A sensor network comprising a plurality of sensing devices according to claim 4.

* * * * *